United States Patent Office 2,807,051
Patented Sept. 24, 1957

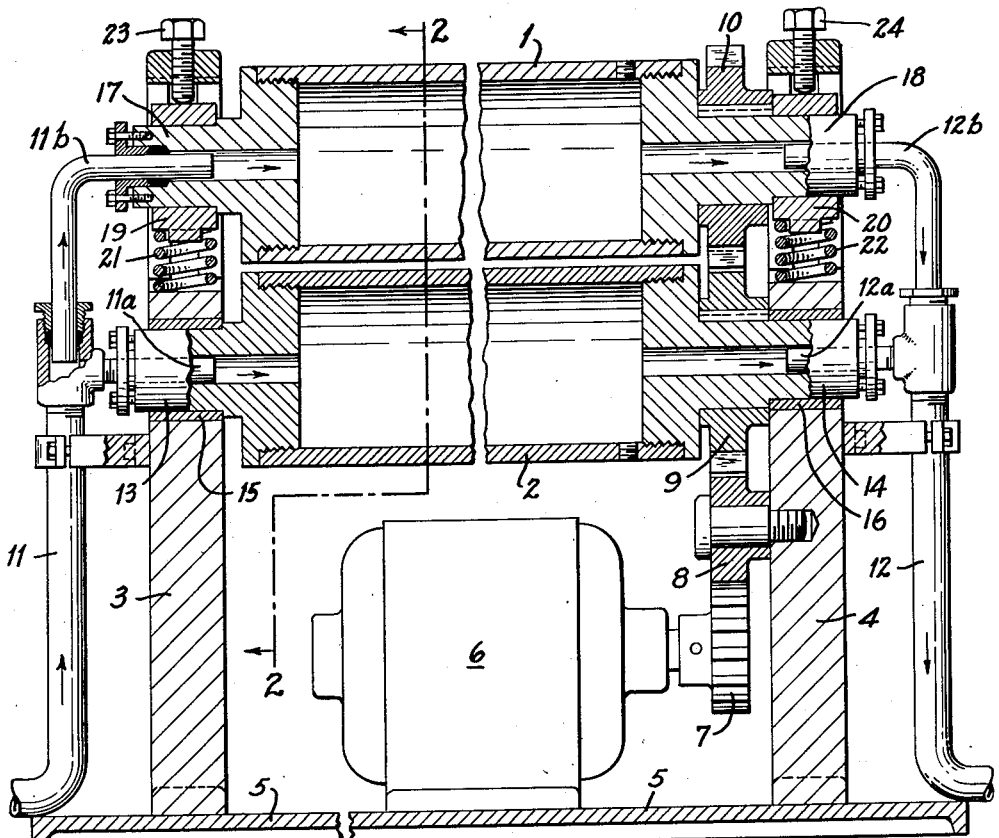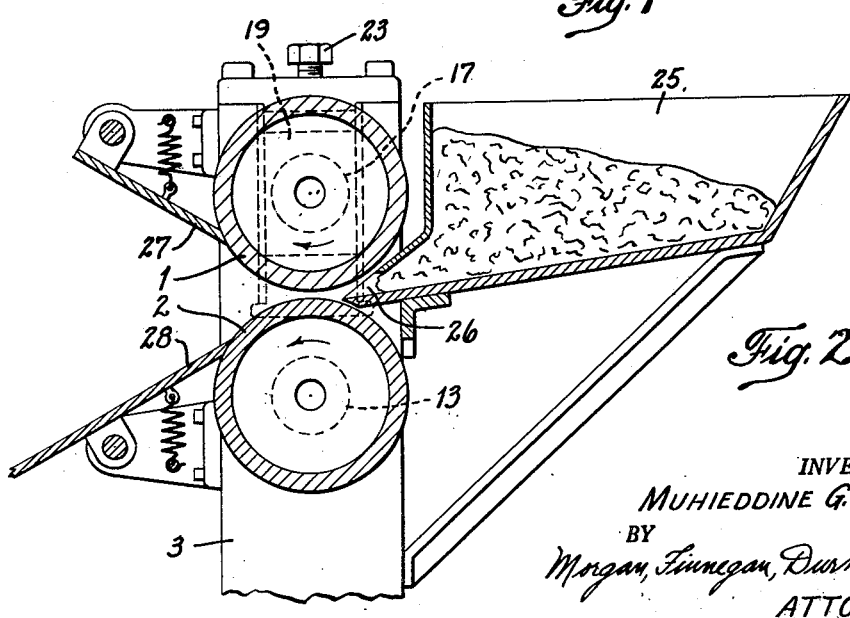

2,807,051

PROCESS FOR COOLING, PRESSING, AND DRYING OF PROTEIN CONTAINING GLUE

Muhieddine G. Yaffi, Beirut, Lebanon

Application May 19, 1954, Serial No. 430,962

3 Claims. (Cl. 18—55)

The present invention relates to a novel process for the cooling, pressing and drying of crude protein containing glues obtained from animal and vegetable matter; and in particular with respect to the production of casein from skim milk.

An object of my invention is to provide a novel process wherein protein containing glues, such as casein, of relatively low water content are produced. A still further object of my invention is to provide a cheap and simple process for the cooling, pressing and drying of protein containing glues; such as casein, without the necessity of employing the costly and cumbersome cooling, pressing and drying steps heretofore employed. Another object of my invention is the production of protein containing glues, such as casein in the form of thin sheets.

Objects and advantages of the invention will be set forth in part hereinafter and in part will be obvious herefrom, or may be learned by practice with the invention, the same being realized and attained by means of the steps, processes, constructions and improvements pointed out in the appended claims.

The invention consists in the novel steps, processes, constructions, and improvements herein shown and described.

In order to describe my invention clearly, the production of casein from skim milk will be used as an illustrative example of the protein containing glues utilized within the scope of the present invention. The invention, broadly, however, covers the cooling, pressing and drying of other crude protein containing glues coagulated and washed in a manner equivalent to the hereinbelow described process with respect to casein; as for example, the production of protein glue from soya-bean.

It is well known that raw casein may be produced from fresh skimmed milk. A typical method for the production of casein comprises the addition of a small amount of a coagulating agent such as rennin, sulfuric acid, hydrochloric acid, lactic acid, various bases etc. to fresh, well skimmed and non-boiled milk. For example, a concentration of one part of sulfuric acid with 10 parts of water is a typical coagulating agent used in the production of casein from skim milk. The coagulating agent is poured into the milk while the latter is continuously stirred, said operation generally being carried out at room temperature. The resulting product is then placed in a water bath and continuously stirred until the milk coagulates, said result being obtained when the temperature reaches 60–65° C. This coagulation product is commonly known as casein.

Next, the casein is extracted from the water bath and is then placed in a hot water bath and continuously stirred in order to carry out the washing of the product to remove all of the traces of the coagulating agent, glucose and other impurities. The so treated product maintains its ductility which is one of the paramount qualities desired in the product.

It should be understood that the above described process for the production of raw casein does not constitute any part of the present invention as it is conventional. It is with respect to the now described subsequent treating steps that my invention comes into being.

Accordingly, the casein from the hot bath must be then cooled, pressed and dried. Heretofore, the hot casein from the water bath was placed in cloth bags, preferably cooled in a cooling bath, and pressed by conventional pressing methods utilizing expensive pressing apparatus. At this point, the casein would have a minimum water content in the range of 60–65%.

The pressed casein was then shaped into the form of beads or the like and placed in an expensive drying apparatus for a long period of drying, after which it had a minimum water content of about 12%.

The above described conventional cooling, pressing and drying operations are cumbersome and expensive. A major disadvantage of such a method is the fact that the raw casein has the property of sticking to any surface coming into contact therewith, thus producting difficult problems as far as the cooling, pressing and drying operations are concerned.

In order to overcome the disadvantages of the heretofore employed processes, I have invented my novel process. In accordance with my invention, the hot casein from the water bath is rapidly cooled, pressed and dried by passing the casein from the hot water bath between two cooled rollers rotating in opposite directions. The pressure applied to the casein by the rollers causes the casein to emerge therefrom in the form of sheets. The rollers are adjustable with respect to each other so that the distance therebetween may be varied to control the thickness of said sheet.

The rollers may be made of any suitable material, inert with respect to the protein containing material passed therebetween, such as metal, plastic, etc. Moreover, the rollers may be cooled in any suitable manner, such as by using cooling water on ice etc. Generally, the rollers are cooled to a temperature of 16° C. or below.

When the casein is pressed between the cooled rollers, it will not stick to the cold contacting surface of the rollers. Of course, the thickness of the casein sheets formed will vary depending upon the pressure applied by the rollers to the casein; the pressure being determined by the dimensions and adjustments of the apparatus. A typical pressure applied would be in the range of 5–100 kg./cm.$^2$.

By passing the raw casein through cooled rollers in accordance with my invention, there is developed, within the casein inner coercive forces which cause the natural expulsion of water from the casein reducing the water content to as low as 30%.

The pressed casein emerging from the rollers may be further dried by various methods. For example, the casein may be spread on a suitable support and air dried without any subsequent mechanical steps. Also, casein sheets, of the sulfuric acid and rennin type caseins, may be hung up like linen and air dried without employing any other drying means. The final water content of caseins dried in this manner will depend upon atmospheric conditions. Generally, the final water content will be about 7–8% after a drying period of 5–24 hours. In some instances, as for example, in lactic acid type casein, the sheets produced are not large enough to efficiently permit them to be hung like linens and dried by simple air drying. In such a case, it is more convenient to shape the casein in the form of beads or the like and dry the beads by a simple hot air drier.

In order to describe my invention even more specifically reference is now made to Figs. 1 and 2 of the drawings. Rollers 1 and 2 are rotatably supported on vertical supports 3 and 4 connected by base 5 and are rotatably driven in opposite directions by means of motor 6 through gears 7, 8, 9 and 10. The rollers are water cooled by means of inlet pipe connections 11, 11a and 11b and outlet pipe connections 12, 12a and 12b.

Rollers 1 and 2 are journaled in uprights 3 and 4 in such a manner that roller 1 is vertically adjustable with respect to roller 2. Shafts 13 and 14 of roller 2 are rotatably mounted and fixed vertically in uprights 3 and 4 by means of bushings 15 and 16, respectively. Shafts 17 and 18 of roller 1 are rotatably mounted in journal blocks 19 and 20, respectively, and are spring supported by means of coiled springs 21 and 22 respectively. By manipulating bolt members 23 and 24 respectively, roller 1 may be adjusted with respect to roller 2.

The casein to be passed between the rollers is held in hopper 25 and discharged through opening 26. Spring urged doctor blades 27 and 28 are provided to prevent the casein sheet emerging from the rollers from creeping up said rollers.

In operation, the rollers 1 and 2 are cooled by continuously passing cold water from inlet pipes 11a and 11b through the inner chambers of said rollers, the water being discharged through outlet pipes 12a and 12b. Motor 6 is turned on which causes the rollers to rotate in opposite directions through gears 7–10. The casein is then pressed through opening 26 of hopper 25 forcing it between said rollers causing it to emerge in the form of sheets.

The process of my invention is a decided advancement in the art. For example, now small dairy farmers, by utilizing my simple and inexpensive invention, will be able to produce casein. This was impossible, heretofore, due to the expensive equipment required by the presently known process. No longer is there any need to use drying equipment utilizing combustible charges. In most instances, no drying operations outside of normal aid drying are needed by employing my invention. Advantageously, even where a mechanical drying operation is required, a simple drying apparatus is sufficient with the time required only ¼ of the time usually involved.

The invention in its broader aspects is not limited to the specific mechanisms described but departures may be made therefrom within the scope of the accompanying claims without departing from the principles of the invention and without sacrificing its chief advantages.

What I claim is:

1. A process for the production of continuous, uniform casein sheets comprising passing hot wet coagulated casein taken from a washing bath between two rollers rotating in opposite directions and cooled to a temperature not greater than 16° C. to cause said coagulated casein to emerge from said rollers in the form of a sheet.

2. A process as defined in claim 1, wherein said sheet is dried to reduce the water content of said sheet.

3. A process as defined in claim 1, wherein the water content of the sheet emerging from said rollers is not greater than about 30%, and wherein the final water content of said sheet after drying is not greater than about 8%.

References Cited in the file of this patent

UNITED STATES PATENTS

| 134,690 | Manning | Jan. 7, 1873 |
| 1,327,354 | Perry | Jan. 6, 1920 |

FOREIGN PATENTS

| 696,337 | Germany | Sept. 18, 1940 |
| 449,364 | Great Britain | June 25, 1936 |